United States Patent [19]

Tsuchiya et al.

[11] Patent Number: 5,261,501
[45] Date of Patent: Nov. 16, 1993

[54] FOUR-WHEEL STEERING SYSTEM WITH STEERING MOTOR SHORT CIRCUIT CONTROL

[75] Inventors: Yoshikazu Tsuchiya; Osamu Tsurumiya; Masataka Izawa; Yukihiro Fujiwara; Makoto Murata, all of Tochigi, Japan

[73] Assignee: Honda Giken Kogyo Kabushiki Kaisha, Tokyo, Japan

[21] Appl. No.: 925,930

[22] Filed: Aug. 10, 1992

[30] Foreign Application Priority Data

Aug. 8, 1991 [JP] Japan .................................. 3-223293

[51] Int. Cl.$^5$ .............................................. B62D 5/04
[52] U.S. Cl. .................................... 180/79.1; 180/140
[58] Field of Search ..................... 180/133, 140, 79.1

[56] References Cited

U.S. PATENT DOCUMENTS 4,953,649  9/1990  Kawai et al. ....................... 180/79.1

*Primary Examiner*—David M. Mitchell
*Assistant Examiner*—Andrew C. Pike
*Attorney, Agent, or Firm*—Armstrong, Westerman, Hattori, McLeland & Naughton

[57] ABSTRACT

A four-wheel steering system on an automobile has front road wheels steerable by a steering wheel and rear road wheels steerable by an electric motor and normally biased to a neutral steering position by a spring. The electric motor is energized by a motor driver to steer the rear road wheels through an angle depending on running conditions of the automobile. The electric motor has a winding and two sets of brushes or connecting terminals connected to opposite terminals of the winding. One of the two sets of connecting terminals is connected to the motor driver. The other of the two sets of connecting terminals is connected to a short-circuiting circuit parallel to the motor driver. In the event of a failure, a controller controls the short-circuiting circuit to short-circuit the winding of the motor through the other set of connecting terminals. The short-circuiting circuit comprises a plurality of relays having respective contacts connected in series between the connecting terminals of the other set. The motor driver can also short-circuit the winding of the motor through the one set of connecting terminals in the event of a failure.

3 Claims, 5 Drawing Sheets

FOUR-WHEEL STEERING SYSTEM WITH STEERING MOTOR SHORT CIRCUIT CONTROL

BACKGROUND OF THE INVENTION

Field of the Invention

The present invention relates to a four-wheel steering system for use on an automobile, and more particularly to a four-wheel steering system having primary steerable road wheels steerable by a steering wheel and secondary steerable road wheels steerable by an electric motor, the four-wheel steering system having a fail-safe arrangement for regenerative braking of the electric motor to slowly return the secondary steerable road wheels back to their neutral steering position in the event of a failure of a motor driver or a controller.

Description of the Relevant Art

One known four-wheel steering system for use on an automobile is disclosed in Japanese laid-open patent publication No. 1(1989)-153383. The disclosed four-wheel steering system has primary steerable road wheels steerable by a steering wheel and secondary steerable road wheels steerable by an electric motor. When a motor controlling system fails to operate, the electric current applied to the motor is cut off, and the terminals of the motor are short-circuited to apply regenerative braking to the motor, so that the secondary steerable road wheels are slowly returned to their neutral steering position.

However, if a motor brush is worn out or the failure is caused by a control circuit wire break, for example, then the winding of the motor may not be short-circuited, and, as a result, no regenerative braking may be applied to the motor.

SUMMARY OF THE INVENTION

In view of the aforesaid drawbacks of the conventional four-wheel steering system, it is an object of the present invention to provide a four-wheel steering system which is capable of reliably applying regenerative braking to a motor for slowly returning secondary steering road wheels back to their neutral steering position in the event of a failure.

According to the present invention, there is provided a four-wheel steering system for use on a motor vehicle, comprising a steering wheel, primary steerable road wheels operatively coupled to the steering wheel, an electric motor having a winding and two sets of connecting terminals connected to opposite terminals of the winding, secondary steerable road wheels operatively coupled to the electric motor, biasing means for normally biasing the secondary steerable road wheels to a neutral steering position, a motor driver for energizing the electric motor to steer secondary steerable road wheels through an angle depending on running conditions of the motor vehicle, one of the two sets of connecting terminals being connected to the motor driver, a short-circuiting circuit, the other of the two sets of connecting terminals being connected to the short-circuiting circuit parallel to the motor driver, and control means for controlling the short-circuiting circuit to short-circuit the winding of the motor through the other set of connecting terminals in the event of a failure.

The short-circuiting circuit comprises a plurality of relays having respective contacts connected in series between the connecting terminals of the other set.

The motor driver can also short-circuit the winding of the motor through the one set of connecting terminals in the event of a failure.

The above and further objects, details and advantages of the present invention will become apparent from the following detailed description of a preferred embodiment thereof, when read in conjunction with the accompanying drawings.

DETAILED DESCRIPTION OF THE PREFERRED EMBODIMENT

Figure 1:
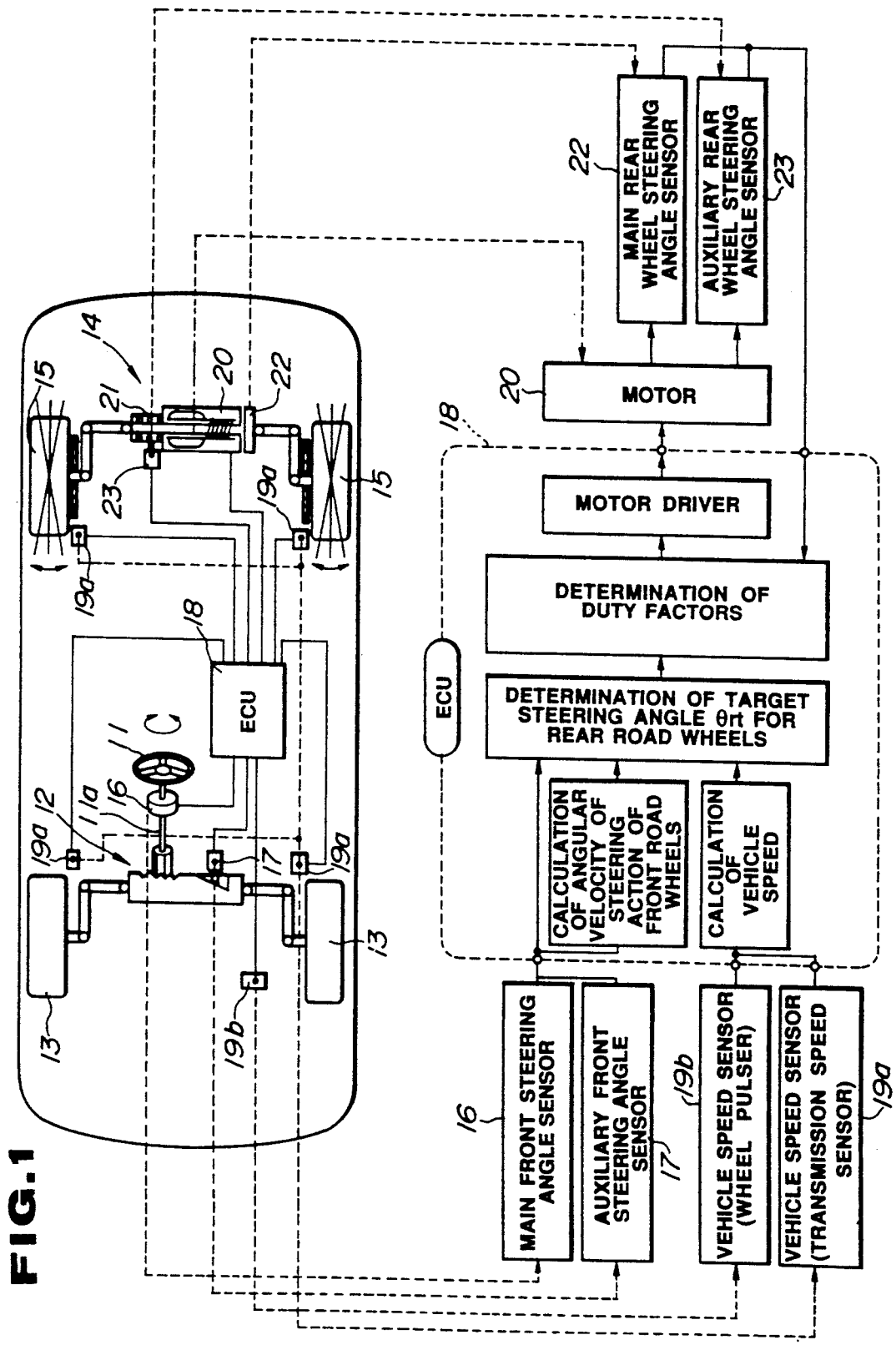
FIG. 1 is a schematic view, partly shown in block form, of a four-wheel steering system according to the present invention.

FIG. 1 schematically shows, partly in block form, a four-wheel steering system according to the present invention.

As shown in FIG. 1, the four-wheel steering system is combined with an automobile having a front wheel steering device 12 mechanically coupled to a steering wheel 11 for steering front road wheels (also referred to as "primary steerable road wheels") 13, and a rear wheel steering device 14 for steering rear road wheels (also referred to as "secondary steerable road wheels") 15. The front wheel steering device 12 comprises a known rack-andpinion gear mechanism which mechanically couples the steering wheel 11 to the front road wheels 13.

The steering wheel 11 is associated with a main front wheel steering angle sensor 16 for detecting the steering angle of the front road wheels 13, i.e., the angle through which the front road wheels 13 are steered. The front steering device 12 is associated with an auxiliary front wheel steering angle sensor 17 for detecting the steering angle of the front road wheels 13. These sensors 16, 17 are electrically connected to a controller 18.

A vehicle speed sensor 19a serves to detect the rotational speeds of the front and rear road wheels 13, 15. Another vehicle speed sensor 19b serves to detect the rotational speed of the output shaft of a transmission (not shown) coupled to the engine of the automobile.

The main front wheel steering angle sensor 16 comprises a digital sensor such as an encoder for detecting the rotational speed of a steering shaft 11a which is connected to the steering wheel 11. The main front wheel steering angle sensor 16 produces three pulse signals, A-, B-, and Z-phase signals, which are out of phase with each other, with respect to the rotational speed of the steering shaft 11a. These A-, B-, and Z-phase signals are supplied to the controller 18. The pulses of the A-, B-, and Z-phase signals are then counted by a microcomputer 26 (see FIG. 2) of the controller 18 to calculate the steering angle of the front road wheels 13.

In a failure diagnostic process, the controller 18 determines that the main front wheel steering angle sensor 16 suffers a failure when:

after the Z-phase signal has been produced, a predetermined number of pulses of the A- or B-phase signal are produced, but no Z-phase signal is produced; or the A-, B-, or Z-phase signal is not produced.

Figure 3A:
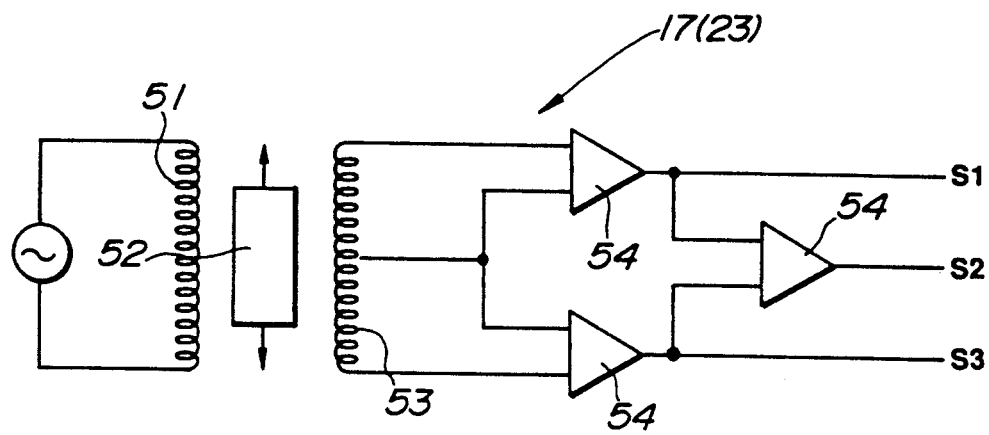
FIG. 3A is a circuit diagram of an auxiliary front wheel steering angle sensor.
Figure 3B:
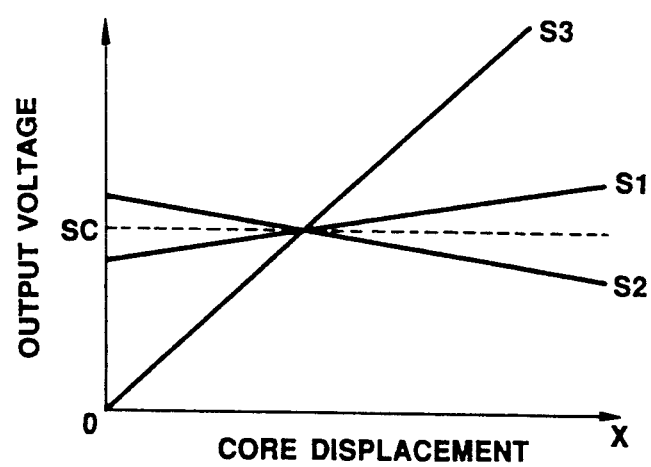
FIG. 3B is a diagram showing output characteristics of the auxiliary front wheel steering angle sensor.

The auxiliary front wheel steering angle sensor 17 comprises a differential transformer for producing an analog signal in response to the displacement of the rack of the front wheel steering device 12. As shown in FIG. 3A, the auxiliary front wheel steering angle sensor 17 comprises a primary coil 51 supplied with an alternating current, a core 52 movable with the rack, and a secondary coil 53. A voltage induced across the secondary coil 53 depending on the position of the core 52 is applied to two operational amplifiers 54 whose output signals are supplied to another operational amplifier 54. These operational amplifiers 53 produce output signals S1, S2, S3. These signals S1, S2, S3 have characteristics as shown in FIG. 3B with respect to the displacement of the core 52, the signal S3 being representative of the steering angle of the front road wheels 13. The neutral steering position of the front road wheels 13 is indicated by a potential SC in FIG. 3B.

In the failure diagnostic process, the controller 18 detects a failure of the auxiliary front wheel steering angle sensor 17 when:

at least one of the signals S1, S2 has a value falling out of a predetermined range; or the difference between the signal S3 and a signal SS given by the following equation:

$$SS = (SC + (S2 - S1) \times a)$$

is of a predetermined value or greater.

The controller 18 detects a failure of the main and auxiliary front wheel steering angle sensors 16, 17 when:

the difference between the absolute values of the output signals from the main and auxiliary front wheel steering angle sensors 16, 17 is of a predetermined value or greater; or the difference between the rates of change in one sampling period of the output signals from the main and auxiliary front wheel steering angle sensors 16, 17 is of a predetermined value or greater.

The rear wheel steering device 14 comprises an electric motor 20 as an actuator for steering the rear road wheels 15. The motor 20 has a rotatable output shaft coupled to the rear road wheels 15 through a ball screw mechanism or the like. The motor 20 is electrically connected to the controller 18 so that the motor 20 can be energized by the controller 18 to steer the rear road wheels 15.

The rear wheel steering device 14 has main and auxiliary rear wheel steering angle sensors 22, 23 for detecting the steering angle of the rear road wheels 15. The ball screw mechanism has a screw shaft that is associated with a spring 21 for normally urging the rear road wheels 15 to their neutral steering position. The main rear wheel steering angle sensor 22 comprises an encoder as with the main front wheel steering angle sensor 16. The auxiliary rear wheel steering angle sensor 23 comprises a differential transformer as shown in FIGS. 3A and 3B, as with the auxiliary front wheel steering angle sensor 17.

The controller 18 detects failures of the main and auxiliary rear wheel steering angle sensors 22, 23 in the same manner as described above with respect to the main and auxiliary front wheel steering angle sensors 16, 17.

Figure 2:
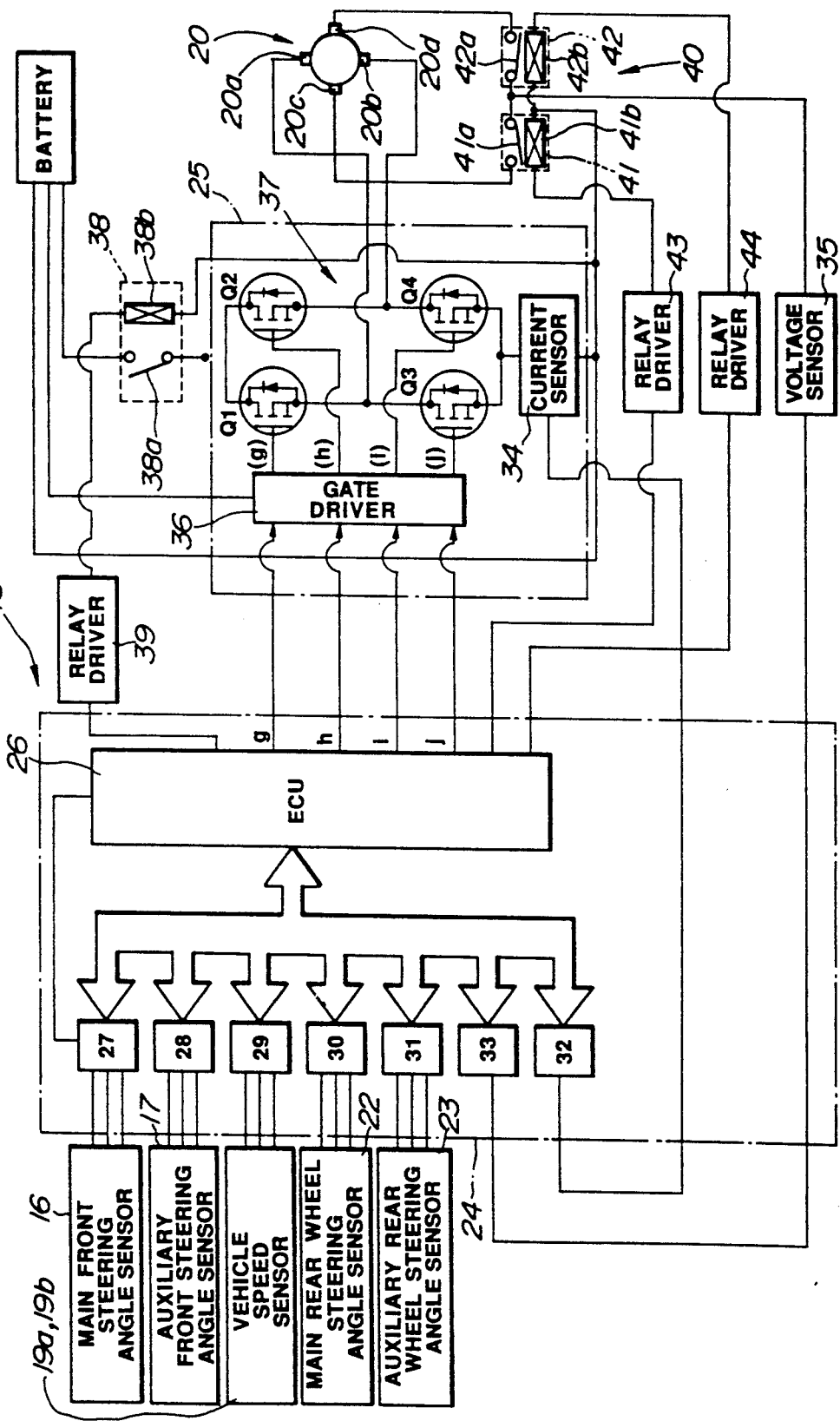
FIG. 2 is a block diagram of a control circuit of the four-wheel steering system shown in FIG. 1.

As shown in FIG. 2, the controller 18 comprises a control section 24 and a drive section 25. The motor 20 is electrically connected to the drive section 25. The control section 24 comprise the microcomputer 26, and seven interfaces 27, 28, 29, 30, 31, 32, 33 which are connected to the microcomputer 26 by data buses. The sensors 16, 17, 19a and 19b, 22, 23 are connected respectively to the interfaces 27, 28, 29, 30, 31. The interface 32 is connected to a current sensor 34 (described later on), and the interface 33 is connected to a voltage sensor 35 (described later on).

The microcomputer 26 is connected to the drive section 25, for applying control signals g, h, i, j to the drive section 25. As described in detail later on, the microcomputer 26 processes output signals from the sensors 16, 17, 19a and 19b, 22, 23, 34, 35 to calculate a target steering angle for the rear road wheels 15, and produces the control signals g, h, i, j which have duty factors depending on the differential between the target steering angle and an actual steering angle of the rear road wheels 15. The microcomputer 26 also serves to detect failures based on the magnitudes or time-dependent changes of the output signals from the sensors, as described above As shown in FIG. 1, the controller 18 also calculates an angular velocity of the steering action of the front road wheels 13 to correct the target steering angle for the rear road wheels 15, and processes the output signals from the vehicle speed sensors 19a, 19b to calculate the speed of the automobile.

The drive section 25 has a gate driver 36, a motor driver 37, a relay 38, and the current sensor 34. The gate driver 36 has a voltage booster and is connected to the microcomputer 26 of the control section 24 and also to the motor driver 37. The gate driver 36 supplies the motor driver 37 with drive signals (g), (h), (i), (j) depending on the duty factors of the control signals g, h, i, j from the microcomputer 26.

The motor driver 37 comprises a bridge of four field-effect transistors (FET) Q1, Q2, Q3, Q4, and is connected between the positive and negative terminals of a battery. More specifically, the motor driver 37 is connected to the positive terminal of the battery through a normally open contact 38a of a relay 38, and to the negative terminal of the battery through the current sensor 34. The motor 20 has terminals connected between a junction between the source and drain of the FETs Q1, Q3, and a junction between the source and drain of the FETs Q2, Q4.

The gates of the FETs Q1, Q2, Q3, Q4 are connected to the gate driver 36 so that the drive signals (g), (h), (i), (j) are supplied from the gate driver 36 to the gates of the FETs Q1, Q2, Q3, Q4. According to the duty factors of the supplied the drive signals (g), (h), (i), (j), the FETs Q1, Q2, Q3, Q4 are turned on and off to energize the motor 20. The gate driver 36 also turns on the FETS Q1, Q2 to apply regenerative braking to the motor 20.

The FET Q1 is supplied with the drive signal (g) whose duty factor corresponds to the duty factor of the control signal g. Similarly, the FETs Q2, Q3, Q4 are supplied with the drive signals (h), (i), (j) whose duty factors correspond respectively to the duty factors of the control signals h, i, j.

The relay 38 has, in addition to the normally open contact 38a, a solenoid 38b connected to a relay driver 39 which is in turn connected to the microcomputer 26. The microcomputer 26 applies a control signal to the relay driver 39 to energize the solenoid 38b.

During normal operation, the solenoid 38b of the relay 38 is energized to close the contact 38a, thereby connecting the motor driver 37 to the battery. In the event of a failure, the solenoid 38b is de-energized to open the contact 38a, thereby disconnecting the motor battery 37 from the battery. The current sensor 34 serves to detect a current flowing through the motor driver 37 and hence a current flowing to the motor 20.

The motor 20 has a rotor with a winding mounted on its rotatable output shaft, and a stator having magnets. The rotatable output shaft of the motor 20 is connected to the rear road wheels 15, as shown in FIG. 1. The motor 20 also has two sets of brushes (connecting terminals) 20a, 20b, 20c, 20d. The opposite terminals of the winding are connected through one of the two sets of brushes 20a, 20b to the motor driver 37, and also connected through the other set of brushes 20c, 20d to a short-circuiting circuit 40 parallel to the motor driver 37.

As shown in FIG. 2, the short-circuiting circuit 40 comprises two short-circuiting damper relays 41, 42. The short-circuiting damper relays 41, 42 comprise respective normally closed contacts 41a, 42a and respective solenoids 41b, 42b, the contacts 41a, 42a being connected in series between the brushes or connecting terminals 20c, 20d of the motor 20. The voltage sensor 35 is connected to a junction between the contacts 41a, 42a to detect the potential between the contacts 41a, 42a.

The solenoids 41b, 42b of the damper relays 41, 42 are connected in series with each other. The solenoid 41b has one terminal connected to a damper relay driver 43, and the solenoid 42b has one terminal connected to a damper relay driver 44. The junction between the solenoids 41b, 42b is connected to the negative terminal (actually ground) of the battery which is shared by the motor driver 37. The damper relay drivers 43, 44 are connected to the microcomputer 26. During normal operation, the microcomputer 26 applies control signals to the solenoids 41b, 42b to energize them for thereby opening the respective contacts 41a, 42a.

Operation of the four-wheel control system will be described below with reference to FIG. 4.

Figure 4:
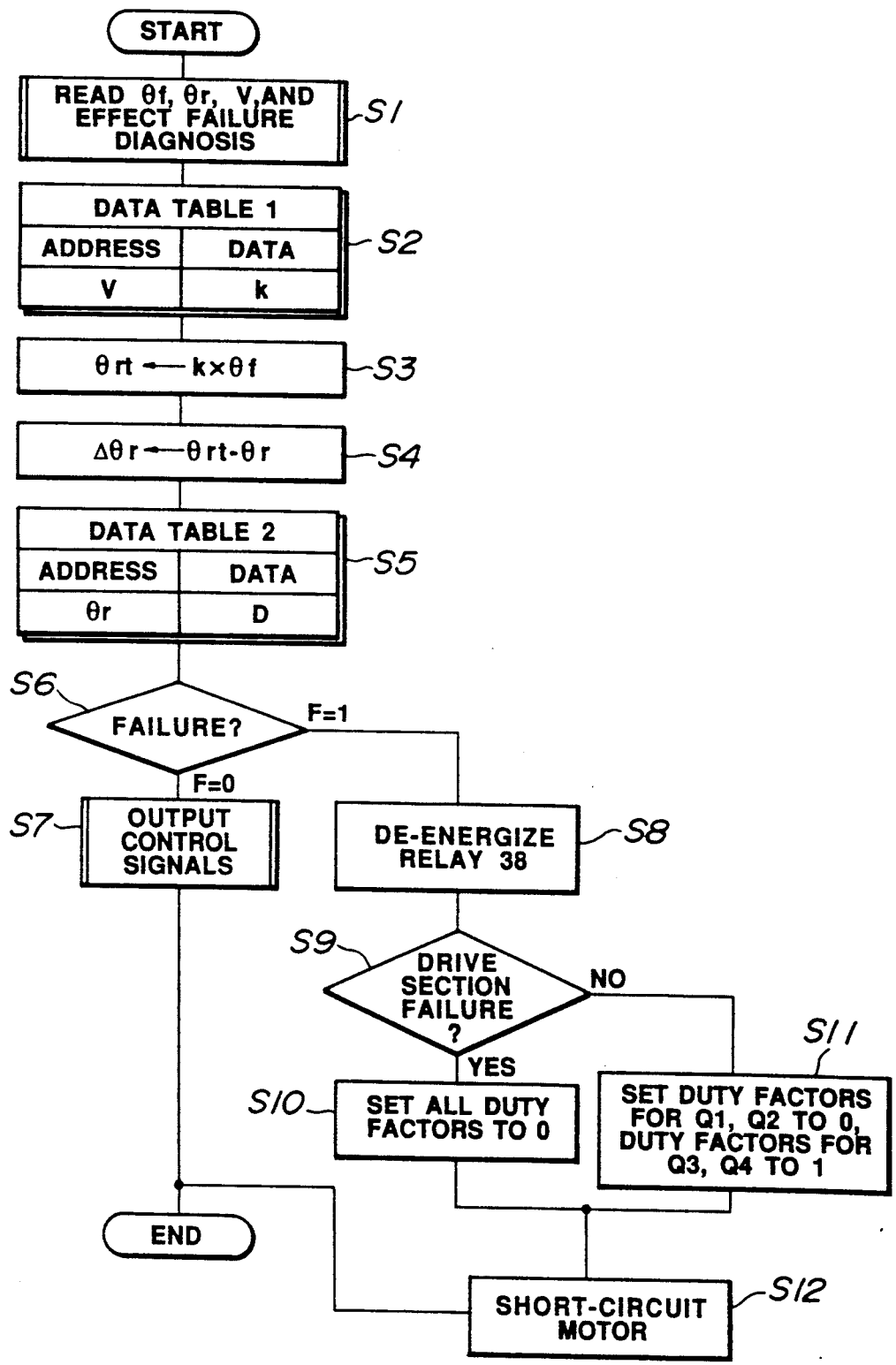
FIG. 4 is a flowchart of a control sequence of the four-wheel steering system.

FIG. 4 shows a control sequence of the four-wheel control system. The microcomputer 26 is programmed to repeatedly execute the control sequence shown in FIG. 4 to control the steering angle of the rear road wheels 15.

First, the microcomputer 26 reads a front wheel steering angle $\theta f$, a rear wheel steering angle $\theta r$, and a vehicle speed V from the sensors 16, 17, 19a, 19b, 22, 23, and determines whether a failure has occurred in a step S1. If the microcomputer 26 detects a failure, it sets a failure flag F to "1". In the failure diagnostic process, the microcomputer 26 detects a failure when one of the various conditions is detected as described above. The microcomputer 26 also compares the target steering angle and the actual steering angle of the rear road wheels 15, and detects a failure when the difference between the compared angles is of a predetermined value or greater.

Figure 5A:
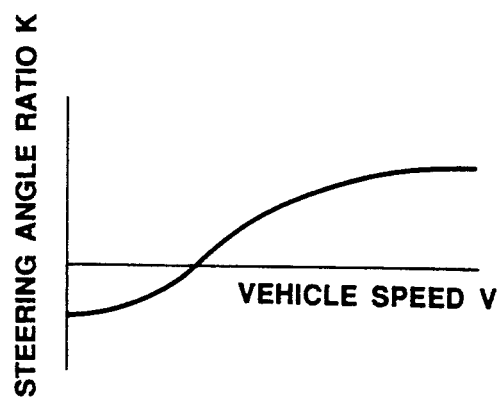
FIGS. 5A and 5B are diagrams showing data tables used in the control sequence.

In a next step S2, the microcomputer 26 searches a data table 1 shown in FIG. 5A for a steering angle ratio K using the vehicle speed V as an address. The microcomputer 26 then multiplies the front wheel steering angle $\theta f$ read from the front wheel steering angle sensors 16, 17, by the steering angle ratio K, thus determining a target steering angle $\theta rt$ for the rear road wheels 15 in a step S3.

Figure 5B:
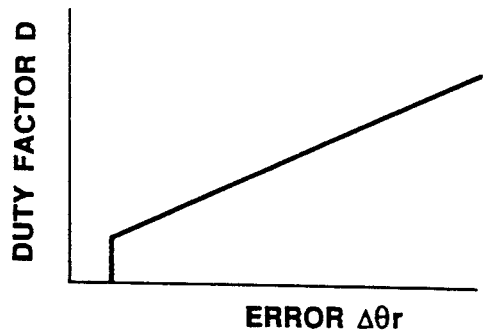

The microcomputer 26 calculates a difference or error $\Delta \theta r$ between the target steering angle $\theta rt$ and the actual rear wheel steering angle $\theta r$ read from the rear wheel steering angle sensors 22, 23 in a step S4. In a next step S5, the microcomputer 26 searches a data table 2 shown in FIG. 5B for a duty factor D using the error $\Delta \theta r$ as an address.

In a step S6, the microcomputer 26 determines whether there is a failure, i.e., whether the failure flag F is "1" or "0". If there is no failure, i.e., the four-wheel control system suffers no failure (F=0), then the microcomputer 26 establishes, in a step S7, the duty factors of the control signals g, h, i, j for the respective FETS Q1, Q2, Q3, Q4 in each of steering directions as shown in the following table:

|  |  | RIGHT |  | LEFT |  | CENTER |  |
|---|---|---|---|---|---|---|---|
| Q1 | Q2 | 0 | 1 | 1 | 0 | 0 | 0 |
| Q3 | Q4 | D | 0 | 0 | D | 1 | 1 |

In the above table, "RIGHT" means steering the rear road wheels 15 to the right, "LEFT" means steering the rear road wheels 15 to the left, and "CENTER" means keeping the present rear wheel steering angle. Therefore, the rear road wheels 15 are steered to the target steering angle by the motor 20.

If there is a failure, i.e., the four-wheel control system suffers a failure (F=1) in the step S6, then the microcomputer 26 de-energizes the relay 38, i.e., opens the contact 38a, to disconnect the motor driver 37 and hence the motor 20 from the battery in a step S8. Thereafter, the microcomputer 26 determines whether the drive section 25, e.g., the motor driver 37, of the controller 18 undergoes a failure or not in a step S9. If the drive section 25 fails, then the microcomputer 26 sets all the duty factors of the control signals g, h, i, j to "0" in a step S10. If there is no failure in the drive section 25, then the microcomputer 26 sets the duty factors of the control signals g, h to "0" and the duty factors of the control signals i, j to "1" in a step S11, thereby keeping the present rear wheel steering angle. The microcomputer 26 cuts off the control signals applied to the damper relay drivers 43, 44 to de-energize the solenoids 41b, 42b, thus closing the contacts 41a, 42a in as a step S12. Therefore, the winding of the motor 20 is short-circuited by the contacts 41a, 42a, and hence regenerative braking is applied to the motor 20. The rear road wheels 15 are now slowly returned to their neutral steering position under the bias of the spring 21.

In the event of a failure of the four-wheel control system, therefore, the motor 20 is disconnected from the battery. The motor 20 can also be short-circuited by the motor driver 37 in the event of a failure. Consequently, the motor 20 can be short-circuited highly reliably by the short-circuiting circuit 40 and the motor driver 37 in the event of a failure.

The series-connected damper relays 41, 42 of the short-circuiting circuit 40 are relatively small in size and capacity, and highly reliably in operation.

Although there has been described what is at present considered to be the preferred embodiment of the invention, it will be understood that the invention may be embodied in other specific forms without departing from the essential characteristics thereof. The present embodiment is therefore to be considered in all respects as illustrative, and not restrictive. The scope of the invention is indicated by the appended claims rather than by the foregoing description.

What is claimed is:

1. A four-wheel steering system for use on a motor vehicle, the system comprising:

a steering wheel;

primary steerable road wheels operatively coupled to said steering wheel;

an electric motor having a winding and two sets of connecting terminals connected to opposite terminals of said winding;

secondary steerable road wheels operatively coupled to said electric motor;

biasing means for normally biasing said secondary steerable road wheels to a neutral steering position;

a motor driver for energizing said electric motor to steer said secondary steerable road wheels through an angle depending on running conditions of the motor vehicle, one of said two sets of connecting terminals being connected to said motor driver;

a short-circuiting circuit, another of said two sets of connecting terminals being connected to said short-circuiting circuit parallel to said motor driver; and control means for controlling said short-circuiting circuit to short-circuit the winding of said motor through said other of said sets of connecting terminals in an event of a failure.

2. A four-wheel steering system according to claim 1, wherein said short-circuiting circuit comprises a plurality of relays having respective contacts connected in series between the connecting terminals of said other of said sets.

3. A four-wheel steering system according to claim 1, wherein said motor driver comprises means for short-circuiting the winding of said motor through said one of said sets of connecting terminals in an event of a failure.

* * * * *